(12) United States Patent
Paparoni

(10) Patent No.: US 6,196,079 B1
(45) Date of Patent: Mar. 6, 2001

(54) CABLE DRIVEN AUTOMOTIVE GEAR LEVER JOINT MECHANISM

(76) Inventor: Paolo Paparoni, Av. Humberto de Alencar Castelo Branco, 860, 09850-300 Sao Bernardo Do Campo, Sao Paulo (BR)

( * ) Notice: Subject to any disclaimer, the term of this patent is extended or adjusted under 35 U.S.C. 154(b) by 0 days.

(21) Appl. No.: 09/005,061

(22) Filed: Jan. 9, 1998

Related U.S. Application Data

(63) Continuation-in-part of application No. 08/542,957, filed on Oct. 13, 1995, now abandoned.

(30) Foreign Application Priority Data

Oct. 19, 1994 (BR) ................................................ 7401842 U

(51) Int. Cl.⁷ .................................................... B60K 20/00
(52) U.S. Cl. ................. 74/473.15; 74/473.1; 74/471 XY
(58) Field of Search ........................... 74/473.15, 473.1, 74/473.33, 473.34, 471 R, 471 XY

(56) References Cited

U.S. PATENT DOCUMENTS

| | | | |
|---|---|---|---|
| 4,397,336 | * 8/1983 | Godfrey | 74/473 R |
| 4,630,500 | * 12/1986 | Suzuki | 74/473 R |
| 4,693,135 | * 9/1987 | LaRocca et al. | 74/473 R |
| 4,879,922 | * 11/1989 | Suzuki | 74/473 R |
| 5,029,488 | * 7/1991 | Buhl et al. | 74/473 R |
| 5,129,278 | * 7/1992 | Nakao | 74/473 R |
| 5,321,993 | * 6/1994 | Herzog et al. | 74/473 R |
| 5,357,823 | * 10/1994 | Parsons | 74/473 R |
| 5,410,931 | * 5/1995 | Pecceu | 74/473 R |

FOREIGN PATENT DOCUMENTS 59-49536 * 9/1982 (JP).

* cited by examiner

Primary Examiner—John A. Jeffery
Assistant Examiner—David Fenstermacher
(74) Attorney, Agent, or Firm—James Ray & Associates

(57) ABSTRACT

A cable driven automotive gear lever joint mechanism for operating a coupling cable and a selection cable having a movable set including a ball joint housing having a lever arm extending therefrom rotatably and pivotally mounted onto a stationary ball joint extending laterally from a support structure with the coupling cable attached to the lever arm for operation thereof, and having a second ball joint extending laterally from the cylindrical ball joint housing for operation of the selection cable.

5 Claims, 6 Drawing Sheets

CABLE DRIVEN AUTOMOTIVE GEAR LEVER JOINT MECHANISM

CROSS REFERENCE TO RELATED APPLICATIONS

This application is a continuation-in-part application of Application Ser. No. 08/542,957, filed Oct. 13, 1995, now abandoned.

FIELD OF THE INVENTION

The present invention relates to a cable driven automotive gear lever joint mechanism, and more particularly to a new and improved external gear shift device of simpler construction and lower cost as compared to those of the prior art, wherein a new and unique rotational set, actuated by a gear lever arm, activates the gear selection cable and the gear coupling cable. The unique rotational set includes a cover housing adapted for manual rotational and pivotal movement about a fixed stationary ball joint extending laterally from a support structure, and includes a second ball joint extending laterally outwardly therefrom. Axial rotational movement of the rotational set is utilized to activate the gear coupling cable, while a transverse pivotal movement of the rotational set is utilized to activate the gear selection cable.

BACKGROUND OF THE INVENTION

As is widely known, an external gear shift control is the device usually used for the remote control of gear shifting in a vehicle when the gear box is located away from the control lever, and normally consists of an integrated set of mechanical elements which include a gear selector control lever, mechanical pivot elements, a support for these elements, and two push-pull type cables to transfer the selection and coupling motions from the lever to the gear motion system inside the gear box. A "push-pull" type transmission cable, which is a flexible element capable of transferring linear motion in both directions, is normally used for both the gear selection cable and the coupling cable. It consists of a specially manufactured flexible internal cable which enables traction and compression force to be transferred, and includes a flexible external casing or conduit in which the cable slides without play. The liner rigidity of the two elements along the cable axis determines the precision of motion transfer. Both ends of the internal cable have terminals which allow it to be connected pivotally to the motion transmission element and the receiving element, while the two ends of the external casing have fasteners to the gear shift command support and to the gear box, respectively.

Typically, the selection of gears is controlled by lateral movement of the lever, i.e., by motion across the direction of motion of the vehicle, and the gears are engaged by longitudinal motion of the lever, i.e., in the direction of motion of the vehicle. In order to accomplish the motion to control the gears, the lever pivots on the fixed base on the vehicle chassis by means of a pivot joint which allows it to pivot in all directions. This joint is frequently accomplished by means of a ball joint, consisting of a ball which pivots within a ball seat. Normally, the ball is a solid piece at the end of the lever, with the seat attached to the base. In cases in which the lower end of the lever pivots, the opposite arrangement is sometimes used, in which the ball is attached to the bottom of the base and the ball seat can move together with the lever. Different types of pivots are also used, such as a universal joint system, for example.

The longitudinal motion of the lever, which determines how the gears are engaged, is normally transferred directly to the terminal of the coupling cable, which is pivotally connected to the lever at a point determined by the functional characteristics of the gear system. When the motion of the coupling cable is to be in the same direction as the motion of the hand of the driver, the cable terminal must be connected to the lever at a point between the pivot joint and the hand of the driver. In the other case, when the system requires that the cable moves in a direction opposite to the direction of motion of the hand of the driver, the terminal connection must be below the pivot joint, usually at the lower end of the control lever. The distance along the lever axis between the pivot joint and the point of connection of the clutch cable terminal is in both cases equal to the lever arm necessary to provide travel to engage the gear in the gear box. Transverse motions of the lever, which determine which gear is selected, must be converted into longitudinal motions so that the two cables (selection and clutch) are parallel and thus extend to the gear box. In order to convert this motion, many different construction forms have been utilized. This motion is frequently converted by means of an L-shaped angular arm with 90 degree extension arms, the arms of which jointly pivot on a shaft, such that the angular arm receives the transverse motion of the lever at one of its ends and, by pivoting on an axis of rotation, transfers longitudinal motion to the cable terminal to which it is connected at the other end of the same arm, thus causing longitudinal motion in the cable which is proportional to the transverse motion of the lever. There are various possible configurations for operation of the angular lever arm.

The function of the support is essentially to form a rigid base for attaching the control lever pivot joint, the angular selection arm pivot shaft and the terminals of the outer casing of the coupling and selector cables, as well as for attaching the entire control device to the chassis of the vehicle. The external gear shift control is required to precisely transfer the gear selection and coupling motions to the gear box, and must be rigid enough to not transfer vibrations to the passenger compartment, must be light and compact enough to minimize weight and clearance, must be resistant to external agents and well protected from dust and other contaminants, and must facilitate maintenance and be economical in its construction so as to be competitive in the automotive industry.

In relation to these requirements, the control systems currently used have many disadvantages. In the rather common case of a control lever with a ball joint in which, for functional reasons, the coupling transmission cable must be activated by the lever at a position below the pivot, the construction of the lever with the ball and ball seat require laborious and lengthy machining, or else welding the lower part of the lever to the ball, requirements which do not facilitate the manufacturing process and jeopardize the strength of the system. The transverse motion of the lever is frequently transferred to an intermediate element which activates the selector cable by means of a ball which is attached laterally to the lever. Fastening this ball to the lever and the need to maintain the alignment with the center pivot point of the lever and the intermediate selection element, all complicate manufacturing and create installation and maintenance problems. Conversion of the transverse motion of the lever to the longitudinal motion of the selector cable also creates problems due the play of the intermediate components of the selection system. This play is most noticeable during motion, thus jeopardizing the precision of the gear shift. The play existing in the gear shift control also influences the transfer of noise from the engine and the transmission system through the cables. In various existing systems, the longitudinal or coupling motion of the lever causes some motion in the selection elements. This situation interferes to some extent with the selection control, making it difficult to change gears and increases the force required to operate the gear shift.

SUMMARY OF THE INVENTION

The purpose of this invention is essentially to present a gear shift control unit that increases the precision of motion, decreases the operational force required and minimizes play and noise by means of a simple and compact construction arrangement which, based upon a few precise and well-placed components, simplifies the manufacturing of the lever and allows a wider range of materials to be used for manufacturing the lever and the unit, thus reducing manufacturing costs, and is amenable to numerous modifications as may be necessary to meet differing design arrangement.

Accordingly, this invention is predicated upon a new and improved cable driven automotive gear lever joint mechanism which overcomes the above and other disadvantages by providing a ball joint with fixed, stationary ball extending laterally from a support structure and a ball joint housing mounted for reciprocal, rotational and pivotal movement on the stationary fixed ball. The ball joint housing is adapted for reciprocal, rotational movement in at least two planes at a right angle to each other, one plane of movement for operation of the selector cable; i.e., the gear selector cable, and the other plane of movement for operation of the coupling cable. Accordingly, this arrangement utilizing a fixed stationary ball eliminates the need for a movable ball operable by the lever arm, and in using a ball joint housing eliminates the need for a bell housing support.

Pursuant to this inventive mechanism, a first ball joint, having a post member on one side thereof, is rigidly secured to a support structure at the post member, such that the first ball joint is disposed laterally away from the support structure and functions as a stationary axis element upon which a rotatable ball joint housing is mounted. A lever arm extends from the rotatable housing for manual, reciprocal pivotal operation in either of two perpendicular planes. A connection of coupling cable is attached directly to the lever arm above or below the ball joint for reciprocal linear movement of the coupling cable with the reciprocal pivotal movement of the lever arm in the longitudinal plane of the vehicle, that is, in the plane perpendicular to the first post on which the first ball joint is fixed. Therefore, pivotal motion of the lever arm in a plane perpendicular to the ball joint's post member (normally aligned with the vehicles direction of movement) will activate the gear coupling cable. A second ball joint, having a second post on one side thereof, is axially secured to the free outer end of the ball joint housing for rotational movement therewith. If the lever arm is pivoted in a plane other than one perpendicular to the ball joint's post member (i.e., transverse to the vehicle's direction of motion), the second ball joint is caused to pivot about the first ball joint so that the axis of symmetry of the second ball joint is pivoted away from the axis of the first post on which the first ball joint is fixed so that the second ball joint is caused to pivoted either upwardly or downwardly as necessary to rotate an "L"-arm which activates the gear selection cable.

OBJECTS OF THE INVENTION

It is a primary object of this invention to provide a new and improved cable driven automotive gear lever joint mechanism which does not basically utilize a movable ball joint or a bell housing thereby greatly simplify construction of the mechanism.

Another object of this invention is to provide a new and improved cable driven automotive gear lever joint mechanism of simple construction which simplifies manufacture and reduces material requirements.

A further object of this invention is to provide a new and improved cable driven automotive gear lever joint mechanism of simple construction which eliminates backlash common to comparable to prior art mechanisms, to give the user a feeling of greater accuracy and activation response.

An even further object of this invention is to provide a new and improved cable driven automotive gear lever joint mechanism of simple construction which eliminates through cable transmitted vibrations of the vehicle engine ("telephone").

Still another object of this invention is to provide a new and improved cable driven automotive gear lever joint mechanism of simple construction which permits attachment of the coupling cable below or above the lever joint center, as each application requires.

It is still a further object of this invention to provide a new and improved cable driven automotive lever joint mechanism wherein a rotational set, actuated by a lever arm, comprises a ball joint housing adapted for rotational, reciprocal movement on a first ball joint fastened laterally on a support structure, such that longitudinal rotation of the ball joint housing is utilized to activate the coupling cable, and transverse pivotal movement of the ball joint housing is utilized to activate the selection cable.

These and other objects and advantages will become apparent from a full understanding of the following detailed description when read with reference to the attached drawings.

DETAILED DESCRIPTION OF THE PREFERRED EMBODIMENTS

Figure 1:
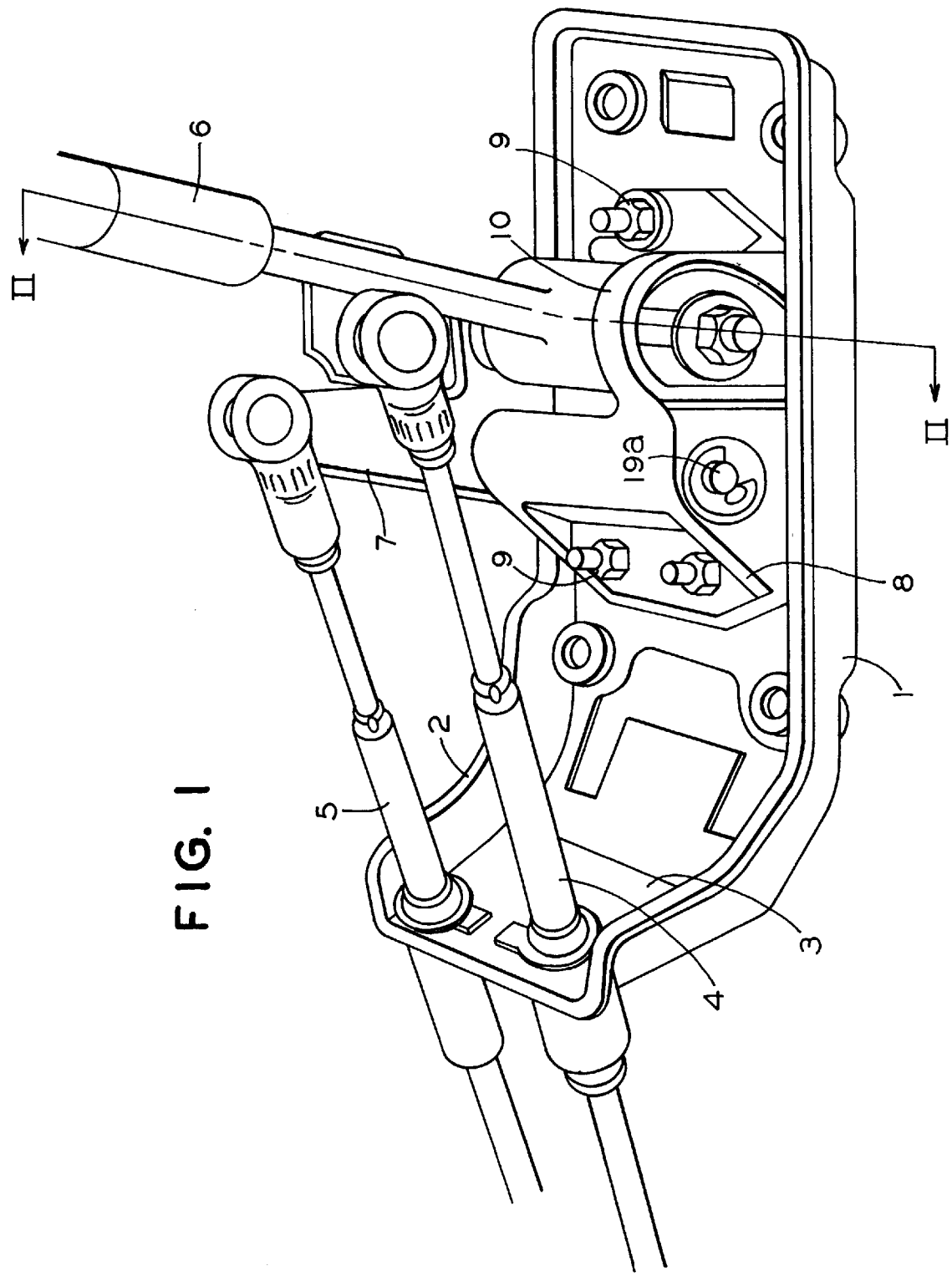
FIG. 1 is an isometric general view of one embodiment of the cable driven automotive lever joint mechanism of this invention with the coupling and selection cables partly visible.

Pursuant to one presently preferred embodiment of this invention, the cable driven automotive lever joint mechanism comprises a metallic support plate 1 having a contouring orthogonal rim 2 to stiffen the support plate 1, and an obliquely inclined front portion 3, through which a coupling (Clutch) cable 4 and a selection cable 5 extend, with the coupling cable 4 extending to a lever arm 6, where it is pivotally coupled, and the selection cable 5 extending to an "L"-arm 7, where it is also pivotally coupled.

A generally L-shaped support housing 8, having an extended wing portion 10 extending therefrom, is attached to the upper surface of support plate 1 by means of nuts and bolts 9. An orthogonal metallic post 12 (FIGS. 2 and 3), having a generally spherical head 13 at its outer end, is attached to the extended wing portion 10 of the support housing 8 with counter screw-nuts 11. While spherical head 13 is to function as a conventional ball joint, a preferred embodiment as shown is to provide the head 13 with conical side portions, a first adjacent to post 12, and a second diametrically opposed to the first, and then fit a spherical bushing 14 thereover, substantially as shown in FIGS. 2 and 3.

The bushing 14, which is intended to function as a ball joint, has a spherical outer surface and an inner surface adapted to mate with generally spherical head 13, is disposed onto generally spherical head 13. Obviously, bushing 14 must comprise two or more components so that it can be fitted over head 13. Bushing 14 comprises the main axis which permits the coupling rotational movement in multiple planes, and may be fabricated of different materials, including corrosion resistant plastics.

A ball joint housing 16, grooved to a pair of annular bearing inserts 15, and to which the lever arm 6 is attached, is disposed onto the outer spherical surface of bushing 14 and is adapted for reciprocal, pivotal rotation on spherical bushing 14. In essence, therefore, ball joint housing 16 is provided with a ball seat formed by annular bearing inserts 15 which jointly form the ball seat disposed onto bushing 14 which functions as a ball joint. One side of ball joint housing 16 is provided with at least a partial annular groove adapted to receive a base disk 17, to which a post 18, having a second spherical head (or ball joint) 19 at the end thereof, is attached. The ball joint 19, when pivoted away from alignment with the axis spherical head 13, comprises the driving means to effect pivotal movement of an "L"-arm 7 on an axis 19a, and accordingly movement of the gear selection cable 5.

Figure 2:
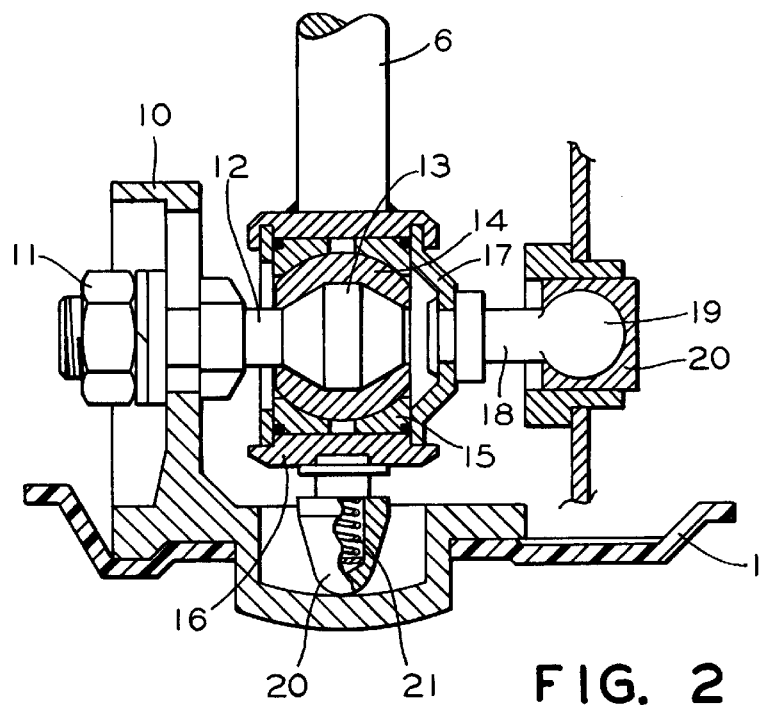
FIG. 2 is an elevational front view of the cable driven automotive lever joint mechanism shown in FIG. 1, shown in partial cross-section, illustrating a pivotal lever arm attached to a ball joint housing mounted for rotational movement on a generally spherical bushing, with the section representing a vertical plane through the axis of post 12 as represented by line II—II of FIG. 1.
Figure 3:
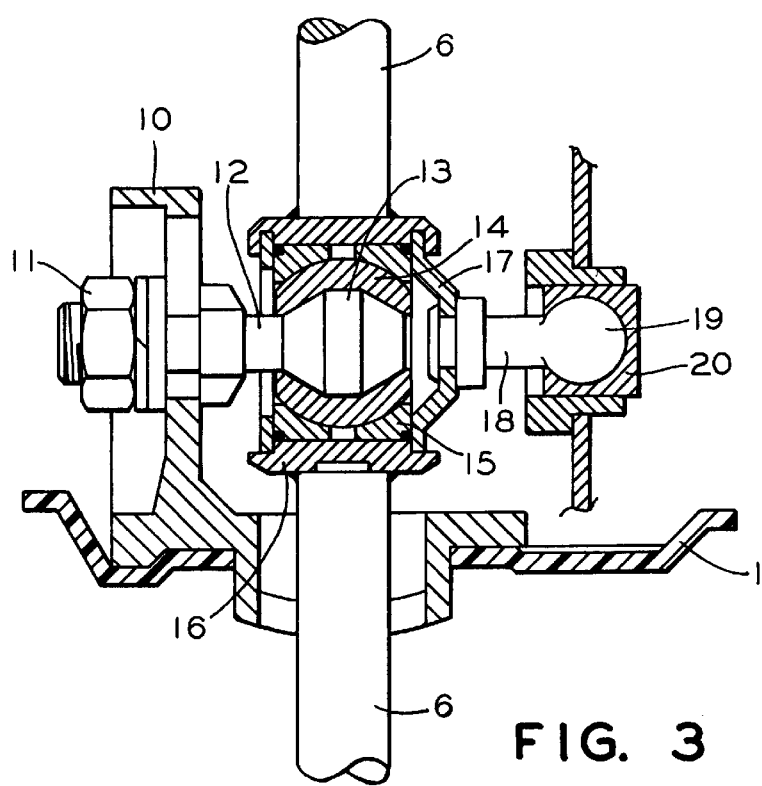
FIG. 3 is the same as FIG. 2 but illustrating another embodiment of the invention wherein a second lever arm extends below the ball joint housing in an opposite direction from the upper lever arm.

As can be seen in FIG. 2, support housing 8 has a portion extending through and below support plate 1 which may optionally contain a pre-selector and steering positioner, which consists of a spring biased friction element 20, adapted to be biased against a lower portion of support housing 8 by compression spring 21, which causes the coupled or neutral gear to limit the backlash normally existing in prior art gear lever mechanisms, at least to some degree, in the gear lever 6, which therefore, transmits to the driver a feeling of greater accuracy and activation responsiveness.

Figure 4:
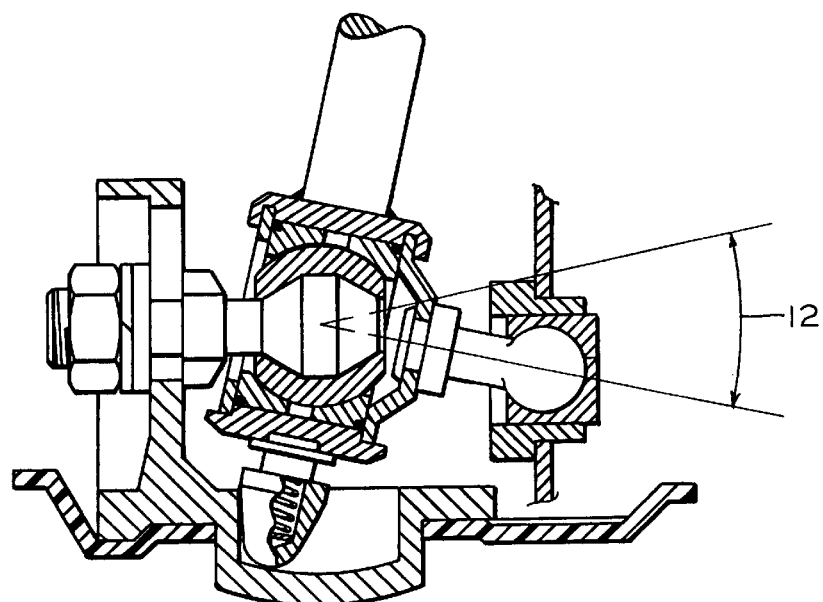
FIG. 4 is substantially the same a FIG. 2 showing the alignment of the elements when the lever arm is pivoted towards the left for purposes of activating the selection cable.

As can be seen in FIG. 1, the coupling cable 4 is pivotally attached to a plate secured to the lever arm 6, which to be activated, requires the angular movement of lever arm 6 with rotational movement of ball joint housing 16 around stationary spherical head 13. This aspect of the invention is one of the novelties thereof and significantly simplifies the set manufacturing, configuration and mounting, and eliminates considerable labor and material. As can further be seen, purely rotational movement of ball joint housing 16 on the axis of spherical head 13 will merely cause ball joint 18 to rotate on its own axis without in any way affecting lever 7. Such rotational movement will, however, activate the connection cable 4. On the other hand, if lever arm 6 is pivoted laterally to the left for example, ball joint housing 16 will be at least partially pivoted transversely to the axis of spherical head 13 so that ball joint 18 is caused to be pivoted downwardly, thereby causing "L"-arm 7 to be rotated clockwise on its axis 19a, and operation of the selection cable 5, as illustrated in FIG. 4. Ball joint 18 is secured within a rotatable bushing 20 locked within the lower arm of "L"-arm. In the same manner, if lever arm is pivoted to the right ball joint housing 16 will be partially rotated in the opposite direction causing ball joint 18 to be pivoted upwardly rotating "L"-arm 7 in the opposite direction. The full degree of such pivotal movement in both directions is depicted by the angle marked "12".

With the gear lever joint mechanism as described above mounted on the floor of a vehicle, adjacent to the driver, it is readily apparent that to shift gears in the vehicle, the driver must merely pivot lever arm 7 to the left or right to select the desired gear with the selection cable 5, and then merely move lever arm 7 in a straight forward or rearward direction to activate coupling cable 4 engaging the previously selected gear.

As may be further apparent, the above described apparatus will present several advantages. The fact that the ball joint housing 16 is an integral part of the lever 7 and that the first ball joint is located therein with the second ball joint located thereon, significantly reduces the volume of the apparatus and increases its strength thus allowing a wider range for selection of materials to be utilized. Since the second ball joint is disposed at the axis of symmetry of the ball joint housing 16, activation of coupling cable 4 by virtue of simple axial rotation of the ball joint housing 16, will not cause any motion of any elements associated with the gear selection function, so that operation of the shifting gears is smoother and more precise.

Figure 8:
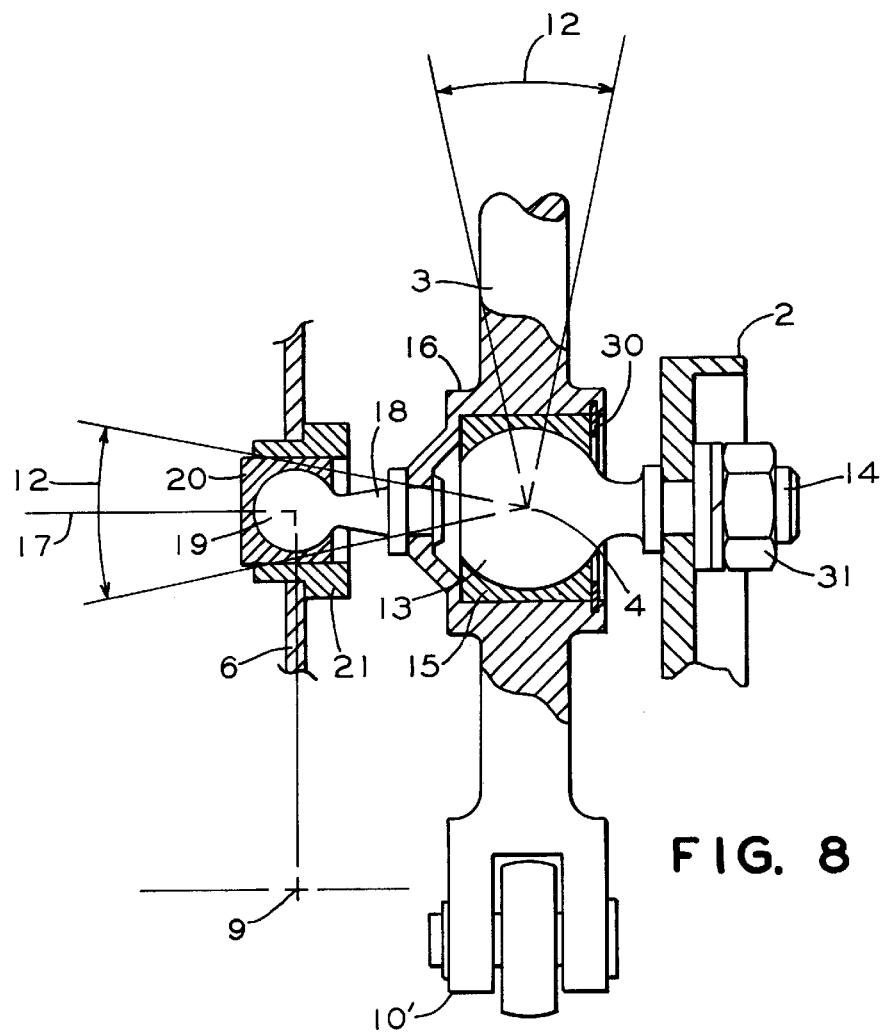
FIGS. 7 and 8 are substantially the same as FIGS. 5 and 6, but illustrate the versatility of this invention in have the coupling and selection cables connected to the underside of the mechanism in situations where it may be essential to operate those cable in the opposite direction.
Figure 5:
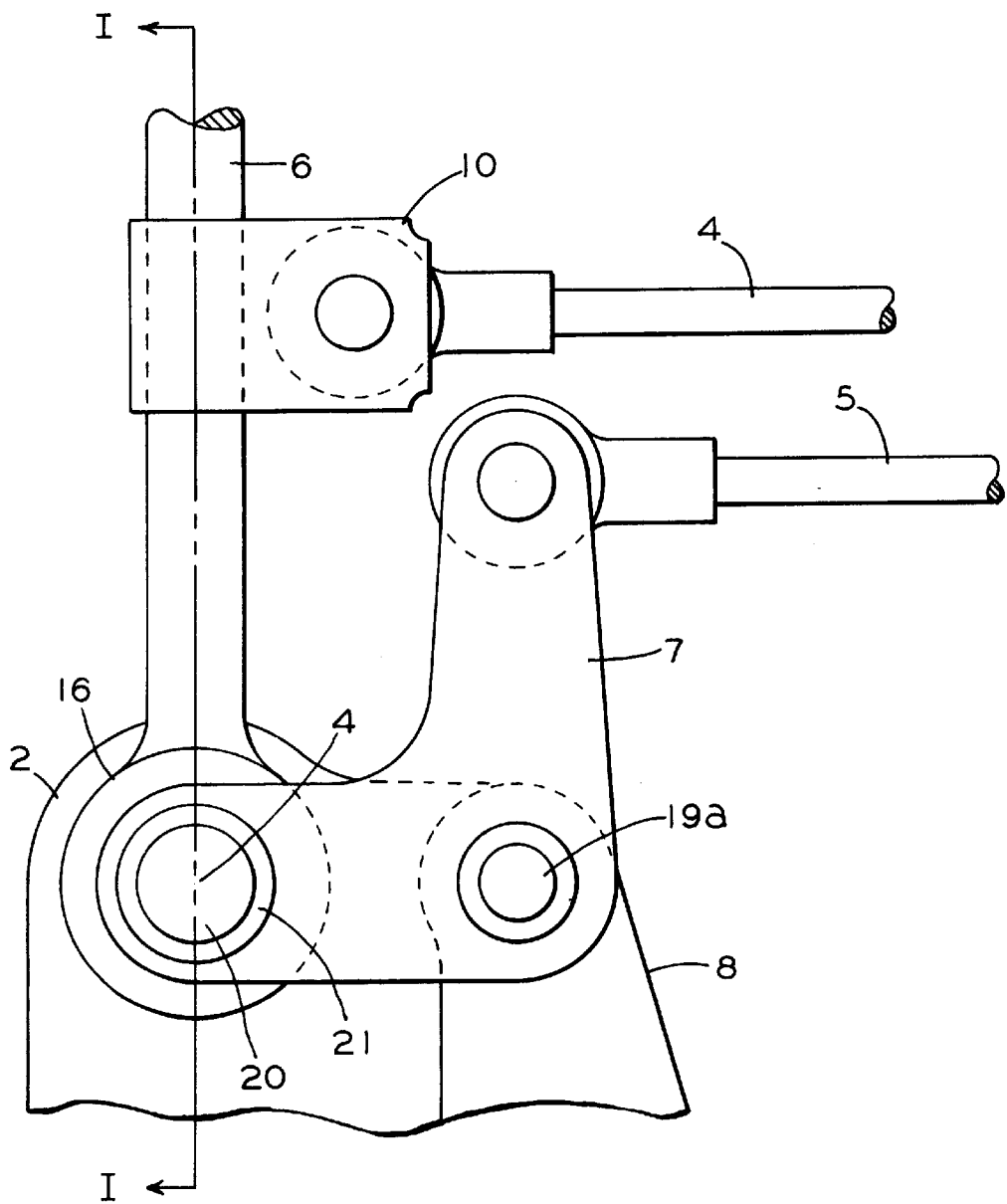
FIG. 5 is a partial elevational side view of the cable driven automotive lever joint mechanism shown in FIGS. 1 and 2 as viewed from the left side thereof which better illustrates the linkage to the selection cable.
Figure 6:
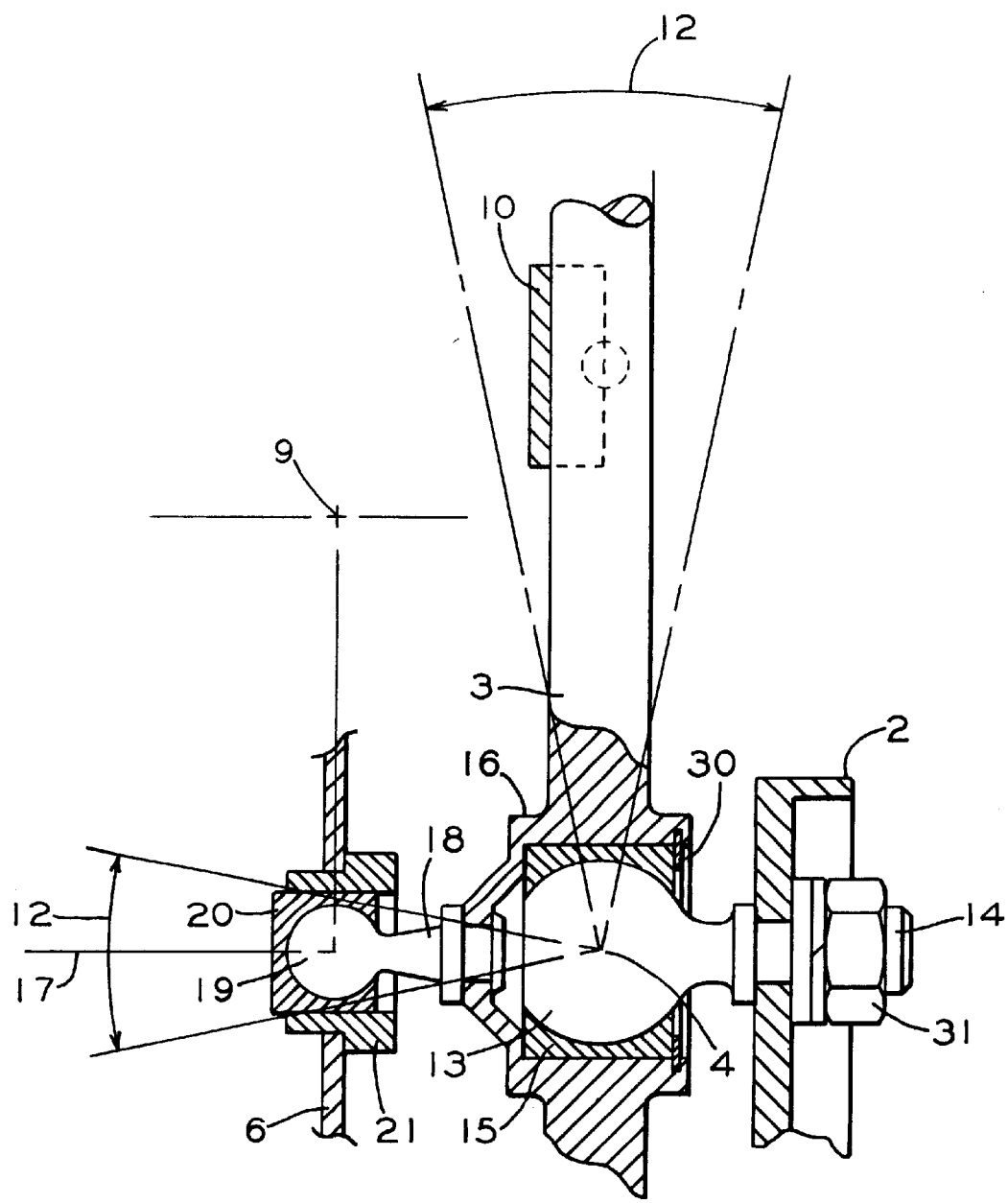
FIG. 6 is an elevational rear view of the cable driven automotive lever joint mechanism substantially as shown in FIGS. 1–2 and 4–5, but differs primarily in utilizing a more conventional ball joint.
Figure 7:
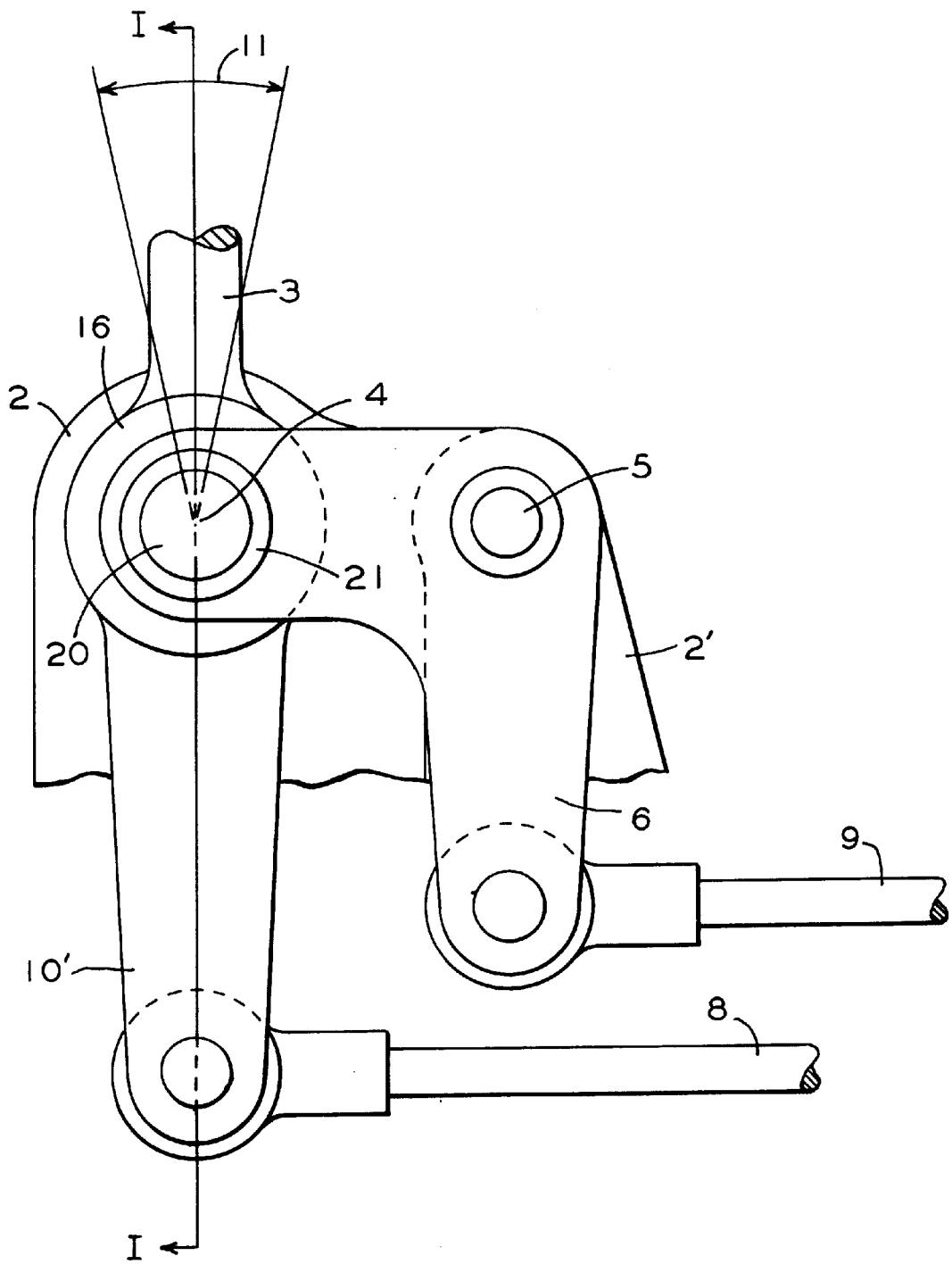

While the above disclosed embodiments illustrate just a few of the possible embodiment of this invention, it should be readily apparat that other embodiments could be designed based on the above description. For example, as disclosed with reference to FIGS. 1–4, both of the cables 4 and 5 are attached to the device so that the cables will be activated in the same direction of the driver's hand movement. As shown in FIGS. 7 and 8, cables 4 and 5 are attached to the device so that the two cables will be activated in the opposite direction.

In addition to the above possible variations, it should be noted that while the embodiment of FIGS. 1–4 show a preferred, rather complex bushing arrangement to effect a ball joint, any form of ball joint can be utilized as suggested in the embodiments of FIGS. 7 and 8. Indeed, even other forms of ball joint fabrication can be utilized as long as the essential ball joint movements can be easily achieved.

As should be apparent, one of the unique advantages of this inventive apparatus is its versatility to be fashioned to meet differing demands and geometries. As an example, reference to FIG. 3 will illustrate another embodiment of the invention, wherein another lever arm 6' extends through the portion of support housing 8 extending below support plate 1 and is attached to the under side of ball joint housing 16. This arrangement may be necessary for some applications, and as noted above, reference to FIGS. 7 and 8 will illustrate arrangements for causing activation of cables 4 and 5 in directions opposite to those shown in FIGS. 1–6, which may be desired for still other applications.

While a number of differing embodiment have been illustrated and disclosed, it should be readily apparent that even more modifications of differing embodiment could be incorporated without departing from the spirit of the invention.

I claim:

1. A cable driven automotive gear lever joint mechanism for operating a coupling cable and a selection cable of a vehicle, said mechanism comprising:
   a) a support structure having a wing portion attachable to such vehicle,
   b) a first ball joint at the end of a first post member attached to said wing portion of said support structure such that said first ball joint is laterally spaced from said support structure by said first post member,
   c) a ball joint housing having a ball seat rotatably mounted onto said first ball joint, said ball joint housing adapted for reciprocal rotational movement on said first ball joint on each of:
      (i) a first rotational axis corresponding with an axis of said post member and parallel to a transverse axis of such vehicle, and
      (ii) a second rotational axis parallel to a longitudinal axis of such vehicle of said post member,
   d) a lever arm extending from said ball joint housing such that selective manual pivotal movement of said lever arm will cause said ball joint housing to rotate on either of said first or said second rotational axes,
   e) a second ball joint on a second post member attached laterally to said ball joint housing having an axis of symmetry corresponding with said first rotational axis such that rotational movement of said ball joint housing on said first rotational axis will cause rotational movement of said second ball joint on its said axis of symmetry, and such that rotational movement of said ball joint housing on said second rotational axis will cause pivotal movement of said axis of symmetry about said first ball joint,
   f) linkage means mounted to said support structure to which said selection cable is attachable, said linkage means responsive to said pivotal movement of said second ball joint to activate said selection cable, and
   g) means for connecting said coupling cable to said ball joint housing such that rotational movement of said ball joint housing on said first axis of rotation will activate said coupling cable.

2. A cable driven automotive gear lever joint mechanism for operating a coupling cable and a selection cable, according to claim 1, wherein said first ball joint is stationary and laterally fixed to said wing portion of said support structure by means of said support structure having an axis of symmetry corresponding with said first rotational axis.

3. A cable driven automotive gear lever joint mechanism for operating a coupling cable and a selection cable, according to claim 1, wherein said ball joint housing is an integral part of said lever arm and has an axis of symmetry perpendicular to said lever arm and has an axial opening through which said first post member extends.

4. A cable driven automotive gear lever joint mechanism for operating a coupling cable and a selection cable, according to claim 3, wherein said second ball joint is laterally attached to said ball joint housing axially opposite said axial opening by means of said second post member, said ball joint and said second post member having an axis of symmetry aligned with an axis of symmetry of said ball joint housing.

5. A cable driven automotive gear lever joint mechanism, according to claim 1, in which said first ball joint is formed by a pair of conically shaped insert portions on either side of central member with a ball shaped bushing fitted thereover.

* * * * *